US007028895B2

(12) United States Patent
Ashaari

(10) Patent No.: US 7,028,895 B2
(45) Date of Patent: Apr. 18, 2006

(54) SYSTEM AND METHOD FOR MANAGING POSTAL INDUCTION, TRACKING, AND DELIVERY

(75) Inventor: Shahpour Ashaari, Gaithersburg, MD (US)

(73) Assignee: United States Postal Service, Washington, DC (US)

(*) Notice: Subject to any disclaimer, the term of this patent is extended or adjusted under 35 U.S.C. 154(b) by 0 days.

(21) Appl. No.: 10/631,269

(22) Filed: Jul. 31, 2003

(65) Prior Publication Data

US 2004/0188522 A1 Sep. 30, 2004

Related U.S. Application Data

(60) Provisional application No. 60/458,600, filed on Mar. 28, 2003.

(51) Int. Cl.
*G06F 17/60* (2006.01)
(52) U.S. Cl. ........................... 235/385; 235/383
(58) Field of Classification Search ................ 235/385, 235/383, 381; 705/22, 28, 7, 8, 401, 402, 705/404, 400
See application file for complete search history.

(56) References Cited

U.S. PATENT DOCUMENTS

| | | | | |
|---|---|---|---|---|
| 5,031,223 A * | 7/1991 | Rosenbaum et al. | ........ | 382/101 |
| 5,043,908 A * | 8/1991 | Manduley et al. | .......... | 700/227 |
| 5,068,797 A * | 11/1991 | Sansone et al. | ............. | 700/219 |
| 5,072,401 A * | 12/1991 | Sansone et al. | ............. | 700/219 |
| 5,450,317 A * | 9/1995 | Lu et al. | ........................ | 705/10 |
| 5,586,037 A * | 12/1996 | Gil et al. | ..................... | 705/407 |
| 5,712,787 A * | 1/1998 | Yeung | .......................... | 705/10 |
| 5,870,715 A * | 2/1999 | Belitz et al. | .................. | 705/22 |
| 5,984,507 A * | 11/1999 | Edens | ......................... | 700/220 |
| 6,233,565 B1 * | 5/2001 | Lewis et al. | ................... | 705/35 |
| 6,701,215 B1 * | 3/2004 | Stadermann | ................. | 700/225 |
| 2001/0035410 A1 * | 11/2001 | Taube et al. | .................. | 220/1.5 |
| 2001/0042024 A1 * | 11/2001 | Rogers | ......................... | 705/26 |
| 2002/0032612 A1 * | 3/2002 | Williams et al. | ............... | 705/26 |
| 2002/0135802 A1 * | 9/2002 | Perez et al. | ................ | 358/1.15 |
| 2002/0138448 A1 * | 9/2002 | Younouzov | .................... | 705/74 |
| 2002/0152174 A1 * | 10/2002 | Woods et al. | .................. | 705/60 |
| 2002/0178074 A1 * | 11/2002 | Bloom | ......................... | 705/26 |
| 2002/0193225 A1 * | 12/2002 | Raming | ...................... | 493/375 |
| 2003/0040944 A1 * | 2/2003 | Hileman | ......................... | 705/5 |
| 2003/0061176 A1 * | 3/2003 | Hoar | ........................... | 705/402 |
| 2003/0069862 A1 * | 4/2003 | Charroppin | .................. | 705/408 |

(Continued)

OTHER PUBLICATIONS

FedEx: http://www.funnybuggy.com/design/design/FEDEX%20Returns/consolidate.htm, 1995-2001.*

(Continued)

*Primary Examiner*—Karl D. Frech
*Assistant Examiner*—Daniel Walsh
(74) *Attorney, Agent, or Firm*—Finnegan, Henderson, Farabow, Garrett & Dunner, L.L.P.

(57) ABSTRACT

A method to track a mailing. The method comprises: receiving mailing information from a mailer, the mailing information comprising shipment information relating to a shipment and a mailing code associated with a mailing, the shipment information comprising a shipment identifier; receiving a shipment at an induction facility, wherein the shipment comprises an encoded shipment and a mailing associated with the mailing code; scanning at least one of the encoded shipment identifier or the mailing code into a scanned code; matching the scanned code to the shipment identifier; notifying the mailer of the induction of the shipment; scanning at least one of the encoded shipment identifier or the mailing code at a delivery facility; and notifying the mailer of the delivery of the shipment.

39 Claims, 13 Drawing Sheets

U.S. PATENT DOCUMENTS

| | | | |
|---|---|---|---|
| 2003/0074333 A1* | 4/2003 | Foth et al. | 705/401 |
| 2003/0110142 A1* | 6/2003 | Sesek et al. | 705/404 |
| 2003/0171948 A1* | 9/2003 | Thomas et al. | 705/1 |
| 2003/0220887 A1* | 11/2003 | Stickler et al. | 705/401 |
| 2003/0225592 A1* | 12/2003 | Algazi et al. | 705/1 |
| 2004/0004119 A1* | 1/2004 | Baldassari et al. | 235/384 |
| 2004/0010475 A1* | 1/2004 | Soltis | 705/401 |
| 2004/0030604 A1* | 2/2004 | Young | 705/26 |
| 2004/0039715 A1* | 2/2004 | Gullo | 705/408 |
| 2004/0073522 A1* | 4/2004 | Rozendaal et al. | 705/402 |
| 2004/0084527 A1* | 5/2004 | Bong et al. | 235/385 |
| 2004/0089482 A1* | 5/2004 | Ramsden et al. | 177/1 |
| 2004/0094615 A1* | 5/2004 | Sansone et al. | 235/375 |
| 2004/0098355 A1* | 5/2004 | Biasi et al. | 705/404 |
| 2004/0103060 A1* | 5/2004 | Foth et al. | 705/40 |
| 2004/0117325 A1* | 6/2004 | Cash et al. | 705/401 |
| 2004/0139036 A1* | 7/2004 | Acton et al. | 705/401 |
| 2004/0153379 A1* | 8/2004 | Joyce et al. | 705/28 |

OTHER PUBLICATIONS

FedEx: http://www.fedex.com/us/about/news/pressreleases/archives/pressrelease481140.html, 1997.*

UPS: http://www.ups.com/content/corp/about/history/1999.html, 1999.*

International Search Report—Patent Cooperative Treaty mailed Oct. 20, 2004.

* cited by examiner

| EMD: A 24-element comma-delimited flat file containing information on mailings, shipments and PLANET™ Codes. |
|---|

EMD Elements:

Shipment
1. Shipment ID
2. Mailer's D-U-N-S® Number
3. Drop Location Facility ZIP Code
4. Drop Location Facility Type Code *
5. DSAS Appointment Number *
6. Transportation Owner's D-U-N-S® Number*
7. Drop Date
8. DSAS Appointment Time *

Mailing
9. Mail Owner's Job Number
10. Mailing Name
11. Mail Owner's D-U-N-S® Number *
12. Mailer's Job Number *
13. Mail Class Code *
14. Mail Type Code *
15. Presort Level *
16. In Home Delivery Start Date*
17. In Home Delivery End Date *
18. Permit Account Number *
19. Permit ZIP Code *
20. Piece Count of Mailing Drop
21. Piece Count of Mailing on Shipment PLANET™ Code
22. PLANET™ Code *
23. Number of Mail Pieces PLANET™ Coded *

Version
24. EMD Version (*) Optional Data Elements

FIG. 9

Shipment ID Barcode Specifications
| Digits | Data |
|--------|------|
| 2 | Service Type Code ("UT") |
| 9 | D-U-N-S® Number |
| 8 | Sequential Shipment ID |
| 1 | Check Digit (MOD 10) |
~ 1010
Sample Shipment ID Barcode
~ 1020
USPS ASN
UT000000001000000026
FIG. 10

SYSTEM AND METHOD FOR MANAGING POSTAL INDUCTION, TRACKING, AND DELIVERY

RELATED APPLICATIONS

This application claims priority from U.S. Provisional Patent Application No. 60/458,600, filed Mar. 28, 2003, which is incorporated herein by reference.

TECHNICAL FIELD

The invention relates to the field of delivery services, and more specifically, a system for and method of managing and tracking postal induction, tracking, and delivery through an automated medium.

BACKGROUND

Mass mail handlers, such as catalog distributors, have a difficult job organizing, tracking, and paying for their mail shipments. Such mail handlers must interface with mailers who produce the mailings, transporters who transport the mailing to the drop facilities, and delivering system operators, such as the United States Postal Service, who take the mailings (induction) and deliver them to recipients. Integrating mail handler systems, mailer systems, transporter systems, and delivery systems is a daunting task. Each of these stakeholders needs a system that can provide integration and accountability of mailings.

While systems exist to provide some tracking features for mailings, these systems have limited ability to track shipments through a system and provide forward notice to downstream operations of incoming shipments. Prior art systems have limited ability to provide an integrated system that provides end-to-end mail accountability; service measurement and performance management; mail coding and tracking; collaborative planning, downstream notification, revenue management and workload forecasting; and payment processing. Prior art systems have limited ability to monitor and track who printed, transported, processed and delivered the mailings; and when and where the mailing was accepted, processed, transported, and delivered.

In addition, there is a need in the delivery industry for systems that integrate with mailer systems and mail handler systems, so that mailings can be planned. In planning mailings, mailer may want: estimates of induction dates based on electronic mail information submitted by mailer; estimated payment amounts based on the electronic mail information; guarantees of payment amounts; estimates of in-home delivery dates; and confirmation of induction.

The present invention is directed to overcoming one or more of the above problems and achieving one or more of the above stated goals.

SUMMARY

Consistent with the present invention, a method is provided to track a mailing. The method comprises: receiving mailing information from a mailer, the mailing information comprising shipment information relating to a shipment and a mailing code associated with a mailing, the shipment information comprising a shipment identifier; receiving a shipment at an induction facility, wherein the shipment comprises an encoded shipment and a mailing associated with the mailing code; scanning at least one of the encoded shipment identifier or the mailing code into a scanned code; matching the scanned code to the shipment identifier; notifying the mailer of the induction of the shipment; scanning at least one of the encoded shipment identifier or the mailing code at a delivery facility; and notifying the mailer of the delivery of the shipment.

Consistent with another aspect of the present invention, a method is provided for planning the future load of a mailing system. The method comprises: receiving mailing information from a mailer, the mailing information comprising shipment information having a shipment identifier, an estimated induction date, and a number of mail pieces in the shipment; and estimating system load on a mail system based on the estimated induction date and the number of mail pieces in the shipment.

Consistent with another aspect of the present invention, a system is provided for tracking a mailing, the system comprises: a memory and a processor, coupled to the memory. The processor is capable of: receiving mailing information from a mailer, the mailing information comprising shipment information relating to a shipment and a mailing code associated with a mailing, the shipment information comprising a shipment identifier; receiving a shipment at an induction facility, wherein the shipment comprises an encoded shipment and a mailing associated with the mailing code; scanning at least one of the encoded shipment identifier or the mailing code into a scanned code; matching the scanned code to the shipment identifier; notifying the mailer of the induction of the shipment; scanning at least one of the encoded shipment identifier or the mailing code at a delivery facility; and notifying the mailer of the delivery of the shipment.

Consistent with another aspect of the present invention, a system is provided for planning the future load of a mailing system. The system comprises: a memory, and a processor coupled to the memory. The processor is operable to: receive mailing information from a mailer, the mailing information comprising shipment information having a shipment identifier, an estimated induction date, and a number of mail pieces in the shipment; and estimate system load on a mail system based on the estimated induction date and the number of mail pieces in the shipment.

Consistent with another aspect of the present invention, a computer-readable medium on which is stored a set of instructions for providing tracking of mailings is provided. When executed, the stored instructions perform stages comprising: receiving mailing information from a mailer, the mailing information comprising shipment information relating to a shipment an a mailing code associated with a mailing, the shipment information comprising a shipment identifier; receiving a shipment at an induction facility, wherein the shipment comprises an encoded shipment and a mailing associated with the mailing code; scanning at least one of the encoded shipment identifier or the mailing code into a scanned code; matching the scanned code to the shipment identifier; notifying the mailer of the induction of the shipment; scanning at least one of the encoded shipment identifier or the mailing code at a delivery facility; and notifying the mailer of the delivery of the shipment.

Consistent with another aspect of the present invention, a computer-readable medium on which is stored a set of instructions for estimating the future load of a mailing system is provided. When executed, the stored instructions perform stages comprising: receiving an induction date in the mailing information, the induction date estimating the date upon which the mailing will be delivered the induction facility; and estimating future system loads based on the induction date.

The foregoing summarizes only a few aspects and is not intended to be reflective of the full scope of the invention as claimed. Additional features and advantages are set forth in the following description, may be apparent from the description, or may be learned by practicing the invention. Moreover, both the foregoing summary and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate a system consistent with the invention and, together with the description, serve to explain the principles of the invention.

FIG. 9 illustrates the fields, or elements, within an Electronic Mailing Data file consistent with the present invention.

FIG. 10 illustrates the composition of a encoded shipment identifier consistent with the present invention.

DETAILED DESCRIPTION

Reference will now be made in detail to the present exemplary embodiments consistent with the invention, examples of which are illustrated in the accompanying drawings. Wherever possible, the same reference numbers will be used throughout the drawings to refer to the same or like parts.

Figure 1:
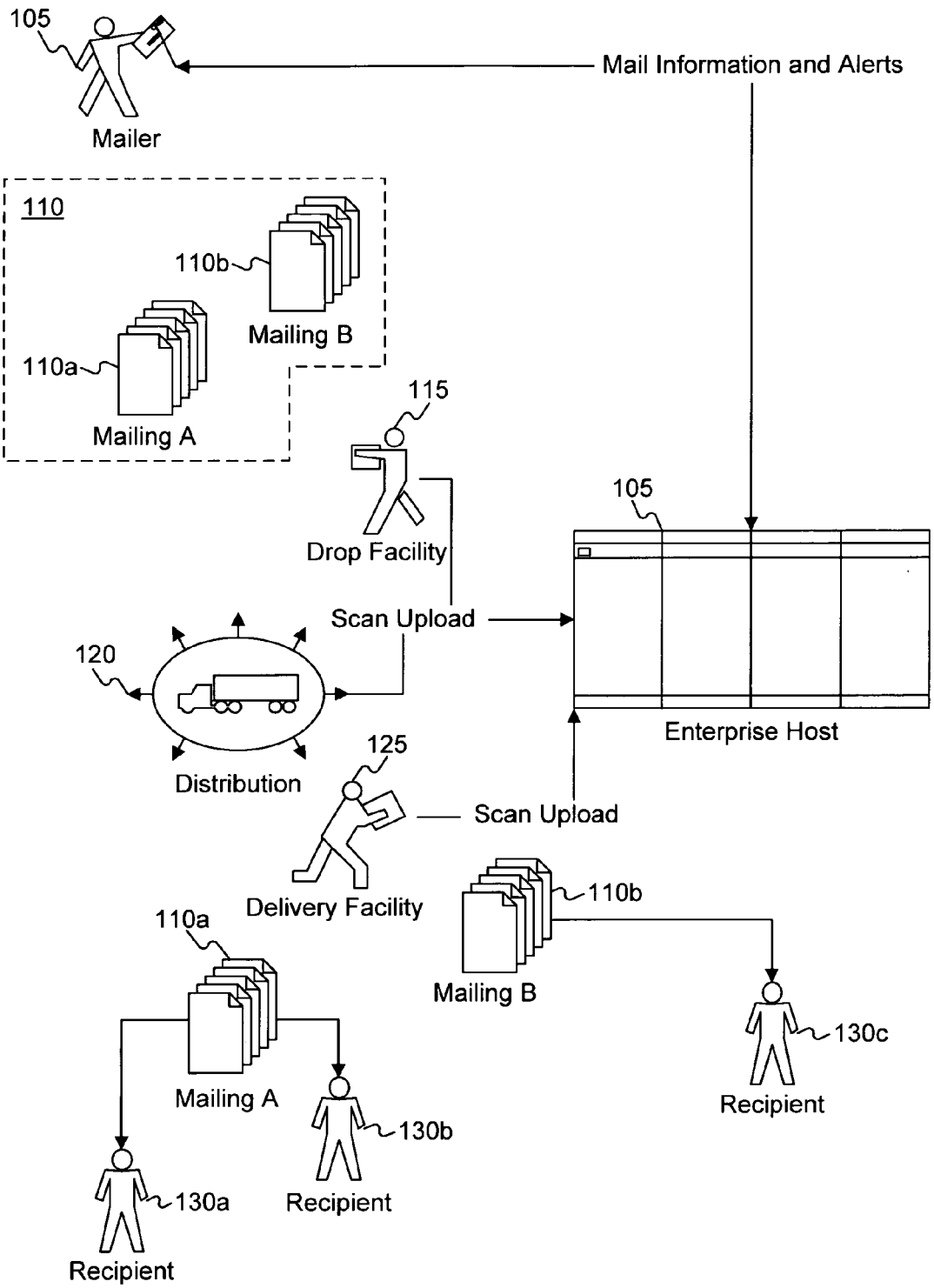
FIG. 1 is an illustration of a system consistent with the present invention in its operating environment.

FIG. 1 is an illustration of a system consistent with the present invention in its operating environment. A mailer 105, such as a company responsible for producing addressed mail pieces on behalf of a mail owner, produces one or more mailings 110a, 110b within a shipment 110. The mail owner, which may be a company generating a high volume of mail, such as a mail-order retailer, may require one or more mailings 110a, 110b to be produced by mailer 105, or a mailer 105 may produce multiple mailings 110a, 110b within a shipment 110 on behalf of multiple mail owners, respectively. Consistent with the present invention, mailer 105 also provides mailing information in an electronic form to an Enterprise Host 150, where the mailing information contains data regarding shipment, including a shipment identifier. Enterprise Host 150 may use the mailing information to anticipate future mail loads on the system.

When Enterprise Host 150 receives the electronic mailing information, it may provide mailer 105 with an estimate of the cost of mailing, an estimated in-home delivery date, and/or an estimated induction date. Enterprise Host 150 may also check a trust account of mailer 105 to determine if mailer 105 has sufficient funds to pay for the shipment. Mailer 105 may provide confirmation that the shipment should be delivered according to the originally submitted electronic mailing information or may provide revised mailing information from which Enterprise Host 150 may recalculate the cost of mailing, providing the recalculated cost to mailer 105. When mailer 105 confirms shipment, Enterprise Host 150 may provide a confirmed induction date. Enterprise Host 150 may use the confirmed induction date to estimate mail loads on the system based on information in the electronic mailing information. These estimated mail loads may be transmitted to downstream systems, so that they may anticipate receipt of the mailings for planning purposes. For example, additional mailing machines may be placed on-line, additional mail workers scheduled, or previously scheduled maintenance may be postponed or otherwise rescheduled.

Mailer 105 delivers shipment 110 to a drop facility 115 of a delivery systems operator, along with an encoded version of the shipment identifier. For example, the encoded version of the shipment identifier may be a barcode of the shipment identifier attached to a container holding mail pieces of the shipment. A mailing code, e.g., a PLANET™ Codes, may be applied to individual mailings or individual mail pieces, directly on the mail piece or through a label on the mail piece. At drop facility 115, the encoded shipment identifier is scanned and transmitted to Enterprise Host 150, where it is matched against the mailing information that was previously sent by the mailer 105 to Enterprise Host 150. Upon a successful matching, Enterprise Host 150 may notify mailer 105 of the successful induction of the shipment.

In addition, Enterprise Host 150 may calculate the actual cost of shipping and retrieve payment from mailer 105 or from the trust account of mailer 105. Enterprise Host 150 may notify mailer 105 of the receipt of payment. Enterprise Host 150 may also calculate an expected in-home delivery date based on system operational load and the induction date.

Following induction of the shipment 110, the mailings 110a, 110b are distributed by the delivery system 120 and the mailing code or shipment identifier may be periodically scanned while in transit. The scanned data may be uploaded to Enterprise Host 150 for further notifications to mailer 105. At one or more delivery facilities 125 of the delivery system operator, mailings 110 are final scanned, the scans may be uploaded to Enterprise Host 150, and notifications may be delivered to mailer 105. Finally, mailings 110 are delivered to recipients 130a, 130b, 130c.

Figure 2:
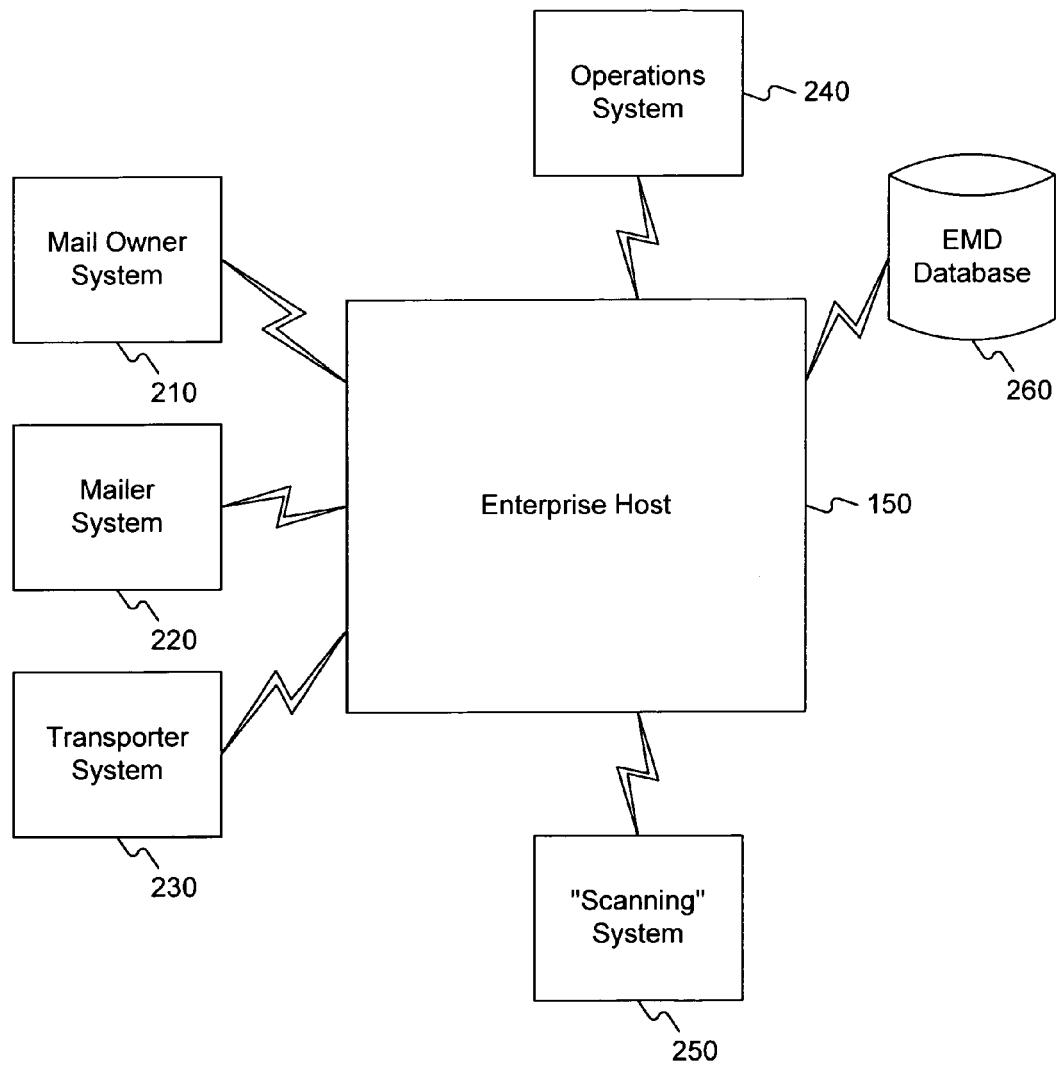
FIG. 2 is a system diagram of components utilized with an Enterprise Host 150 consistent with the present invention

FIG. 2 is a system diagram of components utilized with an Enterprise Host 150 consistent with the present invention. Enterprise Host 150 may comprise tracking and payment systems that interface with external systems, such as Operations Systems 240 and a Scanning System 250, for tracking shipments, estimating in-home delivery dates, and calculating payments for shipments.

Operations System 240 may comprise back-office systems within the delivery environment for providing data on the operational load of the system to Enterprise Host 150 and for receiving shipment information and induction information from Enterprise Host 150. Operations System 240 may also comprise, or link to systems comprising, accounting systems and other back-office systems.

Scanning systems 250 may be located at drop facilities, delivery facilities, and throughout the in-process delivery systems to scan shipments for uploading tracking information to Enterprise Host 150. Scanning systems 250 may comprise scanners, such as bar code or RF scanners, for reading shipment information from containers holding shipment 110, mailing codes or shipment information from mailings 110a, 110b or from mailing codes or shipment information from individual mail pieces, or may comprise any other appropriate apparatus known to those skilled in the art for identifying an identifier on an item, such as a parcel.

Enterprise Host 150 is also coupled to an Electronic Mailing Data ("EMD") Database 260 for storing shipment information and induction information.

Mail Owner System 210, Mailer System 220, and Transporter System 230 are customer systems that provide electronic mailing information and receive tracking information, such as notifications, to and from Enterprise Host 150. A mailer produces one or more mailings for a mail owner that may be delivered to a drop facility by a transporter. Electronic mailing information may be in a form, such as, for example, EMD Data or "mail.dat" data. As will be discussed later, electronic mailing information may contain information on one or more shipments comprising one or more mailings. Each shipment may be tagged with a shipment identifier that may be unique within a time frame, such as one year. Mailings may be tagged with mailing codes or shipment identifiers. Notifications (tracking information) may be provided to one or more of Mail Owner System 210, Mailer System 220, and Transporter System 230.

Figure 3:
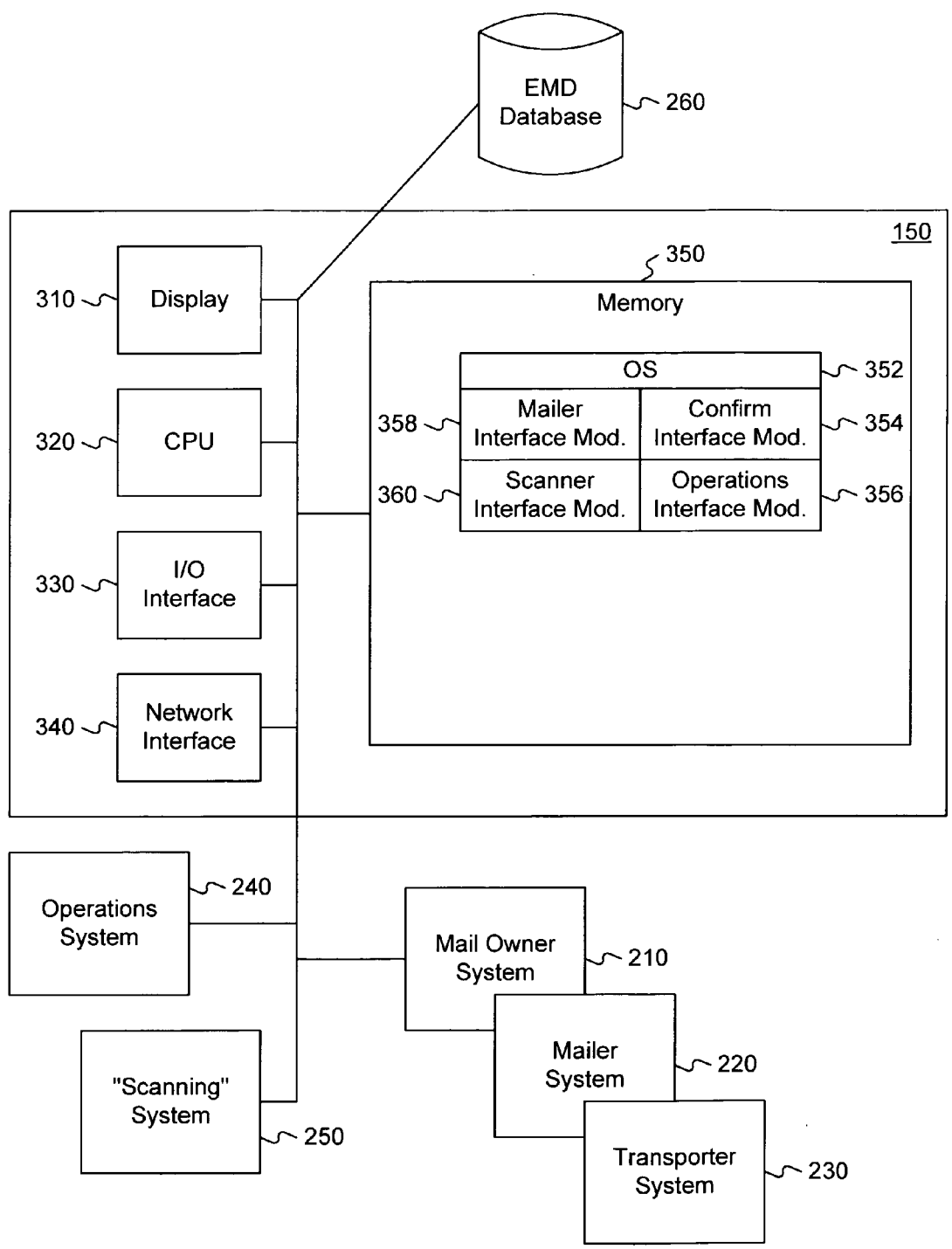
FIG. 3 is a block diagram of an Enterprise Host 150 consistent with the present invention.

FIG. 3 is a block diagram of an Enterprise Host 150 consistent with the present invention. As illustrated in FIG. 3, a system environment of an Enterprise Host 150 may include a display 310, a central processing unit 320, an input/output interface 330, a network interface 340, and a memory device 350 coupled together by a bus. Enterprise Host 150 is adapted to include the functionality and computing capabilities necessary to implement the described tracking and payment functions of Enterprise Host 150 and to access, read, and write to EMD database 260. The input, output, and monitoring of Enterprise Host 150 may be provided on display 310 for viewing.

As shown in FIG. 3, Enterprise Host 150 may comprise a PC or mainframe computer for performing various functions and operations consistent with the invention. Enterprise Host 150 may be implemented, for example, by a general purpose computer selectively activated or reconfigured by a computer program stored in the computer, or may be a specially constructed computing platform for carrying-out the features and operations of the present invention. Enterprise Host 150 may also be implemented or provided with a wide variety of components or subsystems including, for example, one or more of the following: one or more central processing units 320, a co-processor, memory device 350, registers, and other data processing devices and subsystems. Enterprise Host 150 may also communicate or transfer shipment information, payment information, tracking information, and reports via I/O interface 330 and/or network interface 340 through the use of direct connections or communication links to other elements of the present invention. For example, a firewall in network interface 340 prevents access to the platform by unpermitted outside sources.

Alternatively, communication within Enterprise Host 150 can be achieved through the use of a network architecture (not shown). In the alternative embodiment (not shown), the network architecture may comprise, alone or in any suitable combination, a telephone-based network (such as a PBX or POTS), a local area network (LAN), a wide area network (WAN), a dedicated intranet, and/or the Internet. Further, it may comprise any suitable combination of wired and/or wireless components and systems. By using dedicated communication links or shared network architecture, Enterprise Host 150 may be located in the same location or at a geographically distant location from systems 210–260.

I/O interface 330 of the system environment shown in FIG. 3 may be implemented with a wide variety of devices to receive and/or provide the data to and from Enterprise Host 150. I/O interface 330 may include an input device, a storage device, and/or a network. The input device may include a keyboard, a mouse, a disk drive, video camera, magnetic card reader, or any other suitable input device for providing data to Enterprise Host 150.

Network interface 340 may be connected to a network, such as a Wide Area Network, a Local Area Network, or the Internet for providing read/write access to records.

Memory device 350 may be implemented with various forms of memory or storage devices, such as read-only memory (ROM) devices and random access memory (RAM) devices. Memory device 350 may also include a memory tape or disk drive for reading and providing records on a storage tape or disk as input to Enterprise Host 150. Memory device 350 may comprise computer instructions forming: an operating system 352; a Confirm Interface Module 354 for reading, writing, and updating shipment information and tracking information to the Confirm system; an Operations Interface Module 356 for reading, writing, and updating shipment information, tracking information, induction, operating load, and estimated delivery data to the Operations System 240; a Mailer Interface Module 358 for reading, writing, and calculating payment information, induction data, shipment information, tracking information, induction, and estimated delivery data to mailers 220, transporters 230 and mail owners 210; and a Scanner Interface Module 360 for reading shipment scanning information from scanners 250. The confirm system is used to track shipments and confirm shipment induction.

Figure 4:
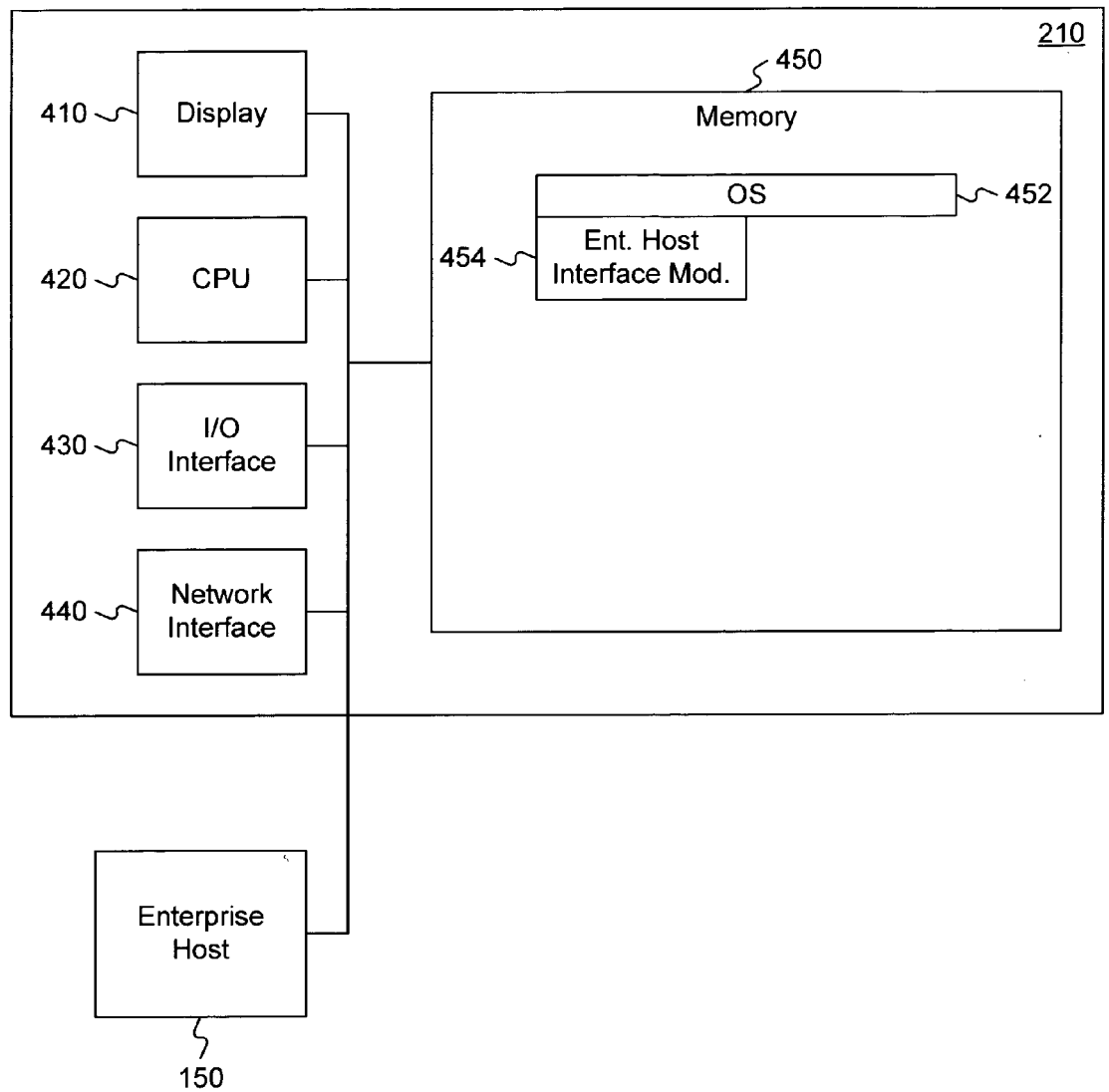
FIG. 4 is a block diagram of a Mail Owner System 210 consistent with the present invention.

FIG. 4 is a block diagram of a Mail Owner System 210 consistent with the present invention. As illustrated in FIG. 4, a system environment of a Mail Owner System 210 may include a display 410, a central processing unit 420, an input/output interface 430, a network interface 440, and a memory device 450 coupled together by a bus. Mail Owner System 210 is adapted to include the functionality and computing capabilities to provide shipment information to Enterprise Host 150 and to receive tracking information from Enterprise Host 150. The input, output, and monitoring of system 210 may be provided on display 410 for viewing.

As shown in FIG. 4, Mail Owner System 210 may comprise a PC or mainframe computer for performing various functions and operations consistent with the invention. Mail Owner System 210 may be implemented, for example, by a general purpose computer selectively activated or reconfigured by a computer program stored in the computer, or may be a specially constructed computing platform for carrying-out the features and operations of the present invention. Mail Owner System 210 may also be implemented or provided with a wide variety of components or subsystems including, for example, one or more of the following: one or more central processing units 420, a co-processor, memory device 450, registers, and other data processing devices and subsystems. Mail Owner System 210 may also communicate or transfer shipment information, payment information, tracking information, and reports via I/O interface 430 and/or network interface 440 through the use of direct connections or communication links to other elements of the present invention. For example, a firewall in (not shown) network interface 440 prevents access to the platform by unpermitted outside sources.

Alternatively, communication within Mail Owner System 210 can be achieved through the use of a network architecture (not shown). In the alternative embodiment (not shown), the network architecture may comprise, alone or in any suitable combination, a telephone-based network (such as a PBX or POTS), a local area network (LAN), a wide area network (WAN), a dedicated intranet, and/or the Internet. Further, it may comprise any suitable combination of wired and/or wireless components and systems. By using dedicated communication links or shared network architecture, Mail Owner System 210 may be located in the same location or at a geographically distant location from Enterprise Host 150.

I/O interface 430 of the system environment shown in FIG. 4 may be implemented with a wide variety of devices to receive and/or provide the data to and from Mail Owner System 210. I/O interface 430 may include an input device, a storage device, and/or a network. The input device may include a keyboard, a mouse, a disk drive, video camera, magnetic card reader, or any other suitable input device for providing data to Mail Owner System 210.

Network interface 440 may be connected to a network, such as a Wide Area Network, a Local Area Network, or the Internet for providing read/write access to records.

Memory device 450 may be implemented with various forms of memory or storage devices, such as read-only memory (ROM) devices and random access memory (RAM) devices. Memory device 450 may also include a memory tape or disk drive for reading and providing records on a storage tape or disk as input to Mail Owner System 210. Memory device 450 may comprise computer instructions forming: an operating system 452 and an Enterprise Host Interface Module 454. Module 454 may be utilized to upload shipment information to Enterprise Host 150 and receive tracking information.

Figure 5:
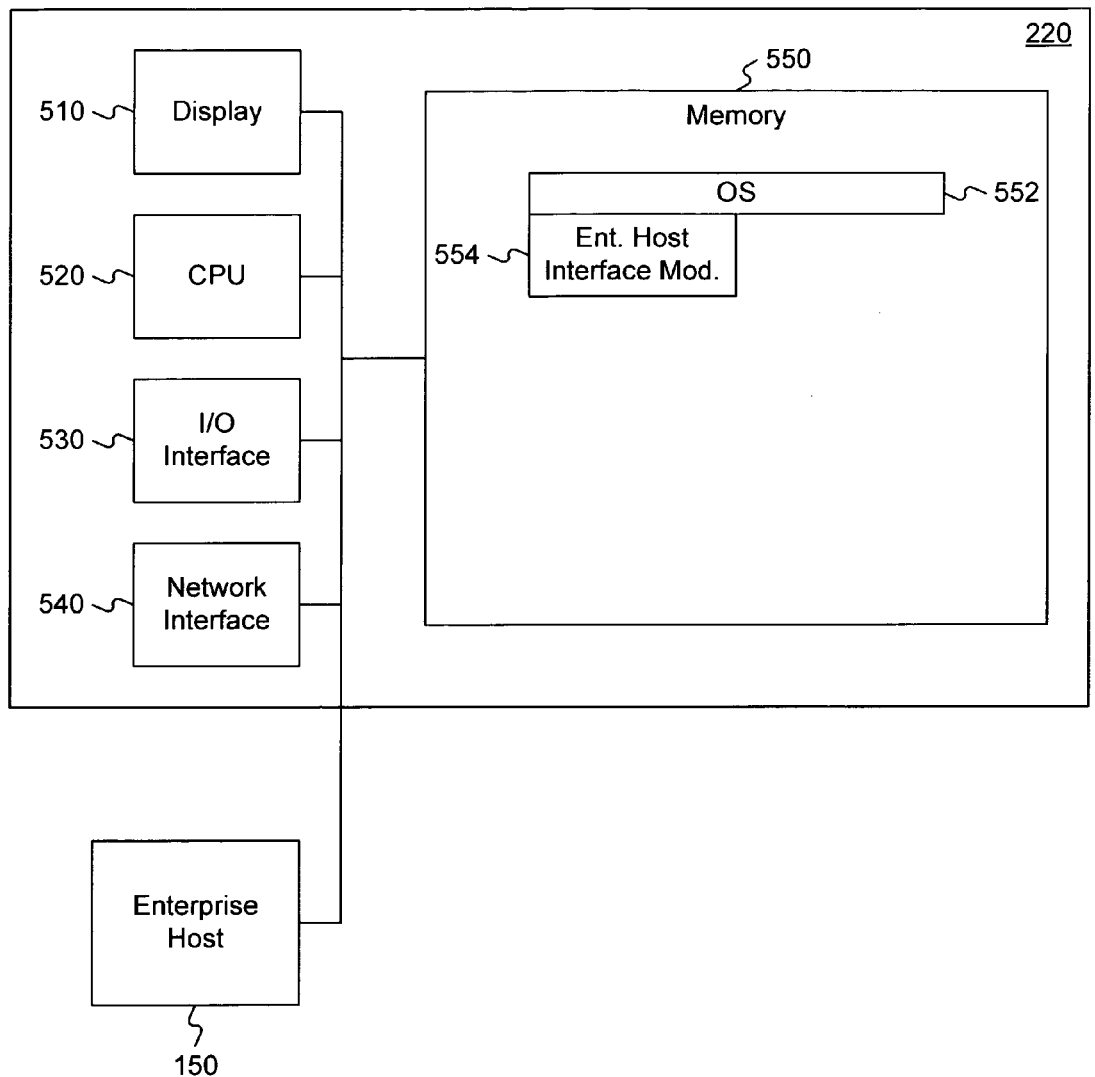
FIG. 5 is a block diagram of a Mailer System 220 consistent with the present invention.

FIG. 5 is a block diagram of a Mailer System 220 consistent with the present invention. As illustrated in FIG. 5, a system environment of a Mailer System 220 may include a display 510, a central processing unit 520, an input/output interface 530, a network interface 540, and a memory device 550 coupled together by a bus. Mailer System 220 is adapted to include the functionality and computing capabilities to provide shipment information to Enterprise Host 150 and to receive tracking information from Enterprise Host 150. The input, output, and monitoring of the system may be provided on display 510 for viewing.

As shown in FIG. 5, Mailer System 220 may comprise a server for performing various functions and operations consistent with the invention. Mailer System 220 may be implemented, for example, by a general purpose computer selectively activated or reconfigured by a computer program stored in the computer, or may be a specially constructed computing platform for carrying-out the features and operations of the present invention. Mailer System 220 may also be implemented or provided with a wide variety of components or subsystems including, for example, one or more of the following: one or more central processing units 520, a co-processor, memory device 550, registers, and other data processing devices and subsystems. Mailer System 220 may also communicate or transfer shipment information, payment information, tracking information, and reports via I/O interface 530 and/or network interface 540 through the use of direct connections or communication links to other elements of the present invention. For example, a firewall (not shown) in network interface 540 prevents access to the platform by unpermitted outside sources.

Alternatively, communication within Mailer System 220 can be achieved through the use of a network architecture (not shown). In the alternative embodiment (not shown), the network architecture may comprise, alone or in any suitable combination, a telephone-based network (such as a PBX or POTS), a local area network (LAN), a wide area network (WAN), a dedicated intranet, and/or the Internet. Further, it may comprise any suitable combination of wired and/or wireless components and systems. By using dedicated communication links or shared network architecture, Mailer System 220 may be located in the same location or at a geographically distant location from Enterprise Host 150.

I/O interface 530 of the system environment shown in FIG. 5 may be implemented with a wide variety of devices to receive and/or provide the data to and from Mailer System 220. I/O interface 530 may include an input device, a storage device, and/or a network. The input device may include a keyboard, a mouse, a disk drive, video camera, magnetic card reader, or any other suitable input device for providing data to Mailer System 220.

Network interface 540 may be connected to a network, such as a Wide Area Network, a Local Area Network, or the Internet for providing read/write access to records.

Memory device 550 may be implemented with various forms of memory or storage devices, such as read-only memory (ROM) devices and random access memory (RAM) devices. Memory device 550 may also include a memory tape or disk drive for reading and providing records on a storage tape or disk as input to Mailer System 220. Memory device 550 may comprise computer instructions forming: an operating system 552, and an Enterprise Host Interface Module 554. Module 554 may be able to upload shipment information to Enterprise Host 150 and receive tracking information.

Figure 6:
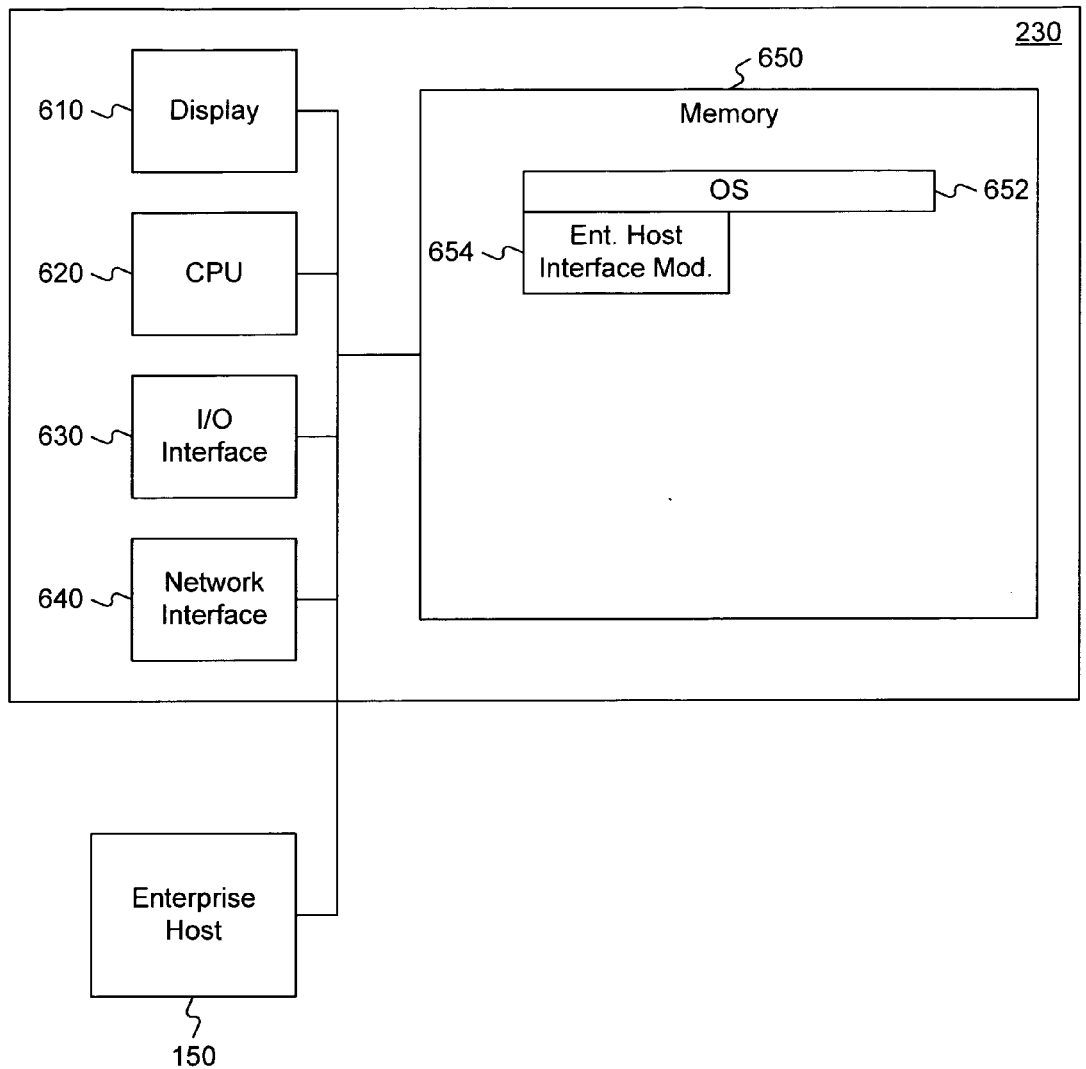
FIG. 6 is a block diagram of a Transporter System 230 consistent with the present invention.

FIG. 6 is a block diagram of a Transporter System 230 consistent with the present invention. As illustrated in FIG. 6, a system environment of a Transporter System 230 may include a display 610, a central processing unit 620, an input/output interface 630, a network interface 640 and memory 650 coupled together by a bus. Transporter System 230 is adapted to include the functionality and computing capabilities to provide shipment information to Enterprise Host 150 and to receive tracking information from Enterprise Host 150. The input, output, and monitoring of the system may be provided on display 610 for viewing.

As shown in FIG. 6, Transporter System 230 may comprise a PC or mainframe computer for performing various functions and operations consistent with the invention. Transporter System 230 may be implemented, for example, by a general purpose computer selectively activated or reconfigured by a computer program stored in the computer, or may be a specially constructed computing platform for carrying-out the features and operations of the present invention. Transporter System 230 may also be implemented or provided with a wide variety of components or subsystems including, for example, one or more of the following: one or more central processing units 620, a co-processor, a memory device 650, registers, and other data processing devices and subsystems. Transporter System 230 may also communicate or transfer shipment information, payment information, tracking information, and reports via I/O interface 630 and/or network interface 640 through the use of direct connections or communication links to other elements of the present invention. For example, a firewall (not shown) in network interface 640 prevents access to the platform by unpermitted outside sources.

Alternatively, communication within Transporter System 230 can be achieved through the use of a network architecture (not shown). In the alternative embodiment (not shown), the network architecture may comprise, alone or in any suitable combination, a telephone-based network (such as a PBX or POTS), a local area network (LAN), a wide area network (WAN), a dedicated intranet, and/or the Internet. Further, it may comprise any suitable combination of wired and/or wireless components and systems. By using dedicated communication links or shared network architecture, Transporter System 230 may be located in the same location or at a geographically distant location from Enterprise Host 150.

I/O interface 630 of the system environment shown in FIG. 6 may be implemented with a wide variety of devices to receive and/or provide the data to and from Transporter System 230. I/O interface 630 may include an input device, a storage device, and/or a network. The input device may include a keyboard, a mouse, a disk drive, video camera, magnetic card reader, or any other suitable input device for providing data to Transporter System 230.

Network interface 640 may be connected to a network, such as a Wide Area Network, a Local Area Network, or the Internet for providing read/write access to records.

Memory device 650 may be implemented with various forms of memory or storage devices, such as read-only memory (ROM) devices and random access memory (RAM) devices. Memory device 650 may also include a memory tape or disk drive for reading and providing records on a storage tape or disk as input to Transporter System 230. Memory device 650 may comprise computer instructions forming: an operating system 652 and an Enterprise Host Interface Module 654. Module 654 may be able to upload shipment information to Enterprise Host 150 and receive tracking information.

Figure 7:
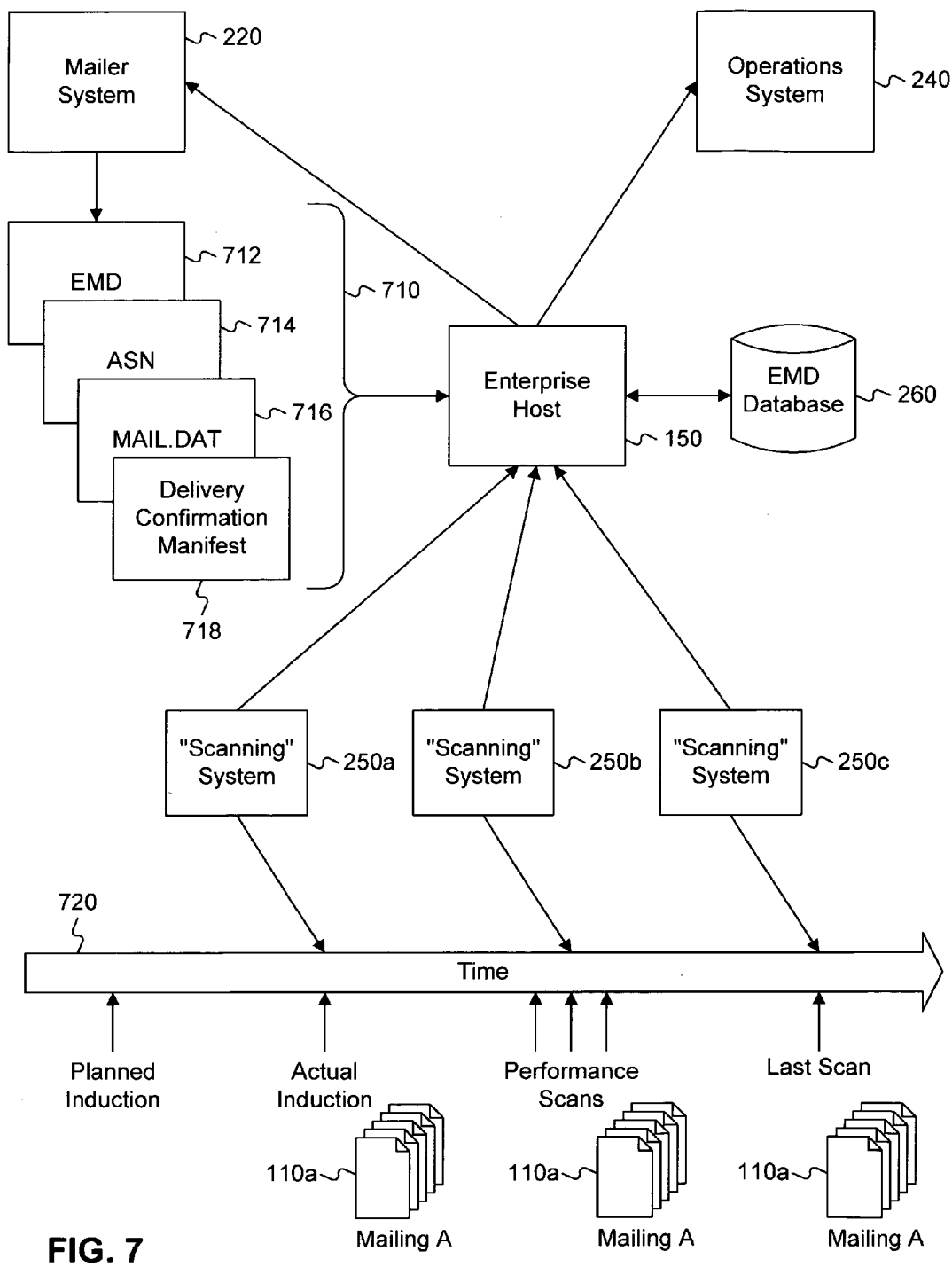
FIG. 7 is a process flow diagram consistent with the present invention.

FIG. 7 is a process flow diagram consistent with the present invention. A mailer produces a shipment 110 having a shipment identifier comprising at least one mailing 110a having one or more mailing codes. Mailer System 220 transmits electronic mailing information 710 to Enterprise Host 150. Electronic mailing information 710 may be provided by, for example, File Transfer Protocol (FTP), email, or through an HTTP web site. Electronic mailing information 710 may include: Electronic Mailing Data 712 (described further below); Advance Shipping Notice (ASN) data 714 (described further below); Mail.dat data 716 (described further below); and a Delivery Confirmation Manifest 718.

Electronic Mailing Data 712 may be a single data text file in comma delimited flat file format. Each record within the text file may be made up of a single row of data comprising several of data elements or fields. Consistent with the principles of the present invention, twenty-four fields may be used. Each Electronic Mailing Data file may comprise one or more shipments. Each shipment may represent one or more mailings. Each mailing may bear zero or more mailing codes, for example, PLANET™ Codes.

Data fields within each record may include one or more of the following fields: a shipment identification (a concatenation of a service code, a creator DUNS® Number (issued by Dun and Bradstreet); a customer-created sequential shipment identifier, and a single check digit); a mailer's DUNS Number, a ZIP code of the drop location facility; a drop location facility type code; an appointment number; a transportation owner's DUNS® Number; an estimated drop date; an estimated drop time; a mail owner's job number; a descriptive mailing name; a mail owner's DUNS® Number; a mailer's job number; a mail class code; a mail type code; a presort level; an in-home delivery start date; an in-home delivery end date; a permit account number; a permit ZIP code; a piece count of the mailing or count value; a piece count of mailing associated with the shipment; a mailing code, for example, a PLANET™ code representing the mailing of one or more individual mailpieces; and PLANET™ codes. Further information on Electronic Mailing Data 712 may be found in Electronic Mailing Data Specification Version 3.0 published by the United States Postal Service, found in U.S. Provisional Patent Application No. 60/458,600, filed Mar. 28, 2003, and incorporated herein by reference.

ASN Data 714 is used with the Confirm system to match mailer ASN Data 714 to PLANET™ Coded mailing to provide enhanced reporting and troubleshooting information. ASN Data 714 comprises specific customer-generated information about mailings, allowing Confirm to compare scan data to the actual data provided by the customer. This permits both the customer and the Postal Service to analyze how the Postal Service processes customer's mail. A customer may prepare ASN Data 714 before the subscriber mail is dropped for delivery. Customers may create ASN Data 714 on a PLANET™ Codes web site, upload the ASN Data 714, or FTP the ASN Data 714.

ASN Data 714 may be a single data file in comma-delimited, flat-file format. Each record may be a single row of data comprising a number of data fields. Consistent with the principles of the present invention, sixteen fields may be used. ASN Data 714 may comprise one or more shipments. Each shipment may comprise one or more mailings. Each mailing may comprise one or more mailing codes, for example, PLANET™ Codes.

Data fields within each record may include one or more of the following fields: a shipment identification (a concatenation of a service code, a creator DUNS® Number (issued by Dun and Bradstreet); a ZIP code of the drop location facility; an estimated drop date; an estimated drop time; an appointment number; a subscriber identifier; a mailing identifier; a descriptive mailing name; a service code; a total number of mail pieces dropped or count value; a delivery window start data; a delivery window end date; a presort level; a mailing code, for example, a PLANET™ Code; and a number of mail pieces mailing coded. Further information on ASN Data 714 may be found in Appendix A of Publication 197—Confirm Service Customer Service Guide published by the United States Postal Service, found in U.S. Provisional Patent Application No. 60/458,600, filed Mar. 28, 2003, and incorporated herein by reference.

Mail.dat Data 716 may include a header, a container summary, a component, and a segment. The header may include the job name and issue. The container summary may contain an entry point field, a scheduled induction date field, a number of pieces, and a Confirm sequential shipment identifier. The component may include a DUNS® Number. The segment may include the mail owner's mailing reference identifier. Further information may be found in Mail.dat Specification for Entry Information and PLANET™ Codes, published by the United States Postal Service, found in U.S. Provisional Patent Application No. 60/458,600, filed Mar. 28, 2003, and incorporated herein by reference Electronic mailing information 710 may be stored in EMD Database 260. When Enterprise Host 150 receives electronic mailing information 710, it may transmit to Mailer System 220 data 711 including an estimate of the cost of mailing, an estimated in-home delivery date, and/or an estimated induction date. Estimated in-home delivery date may be calculated based on the operating load retrieved from Operations System 240. Enterprise Host 150 may also check a trust account of mailer of Mailer System 220 to determine if mailer has sufficient funds to pay for the shipment. Mailer System 220 may provide confirmation that the shipment will occur according to the originally submitted electronic mailing information 710 or may provide revised mailing information from which Enterprise Host 150 may recalculate the cost of mailing for provision to mailer. When Mailer System 220 confirms shipment, Enterprise Host 150 may provide a confirmed induction date.

Timeline 720 represents the progress of mailing 110a through the delivery system. At the time of actual induction, scanning system 250a may scan the coded representation of the shipment identifier, e.g. a bar coded shipment identifier, or one or more mailing codes and upload the induction scan into Enterprise Host 150. Enterprise Host 150 may provide a notification of the induction to Mailer System 220 or other systems by using the shipment identifier or the mailing code. Enterprise Host 150 may also notify Operations Systems 240 of the actual induction of the shipment, so that Operations Systems 240 may plan for processing load of incoming mailing 110a. In addition, Enterprise Host 150 may procure payment from Mailer System 220 following the induction scan.

As mailing 110a travels through the delivery system, one or more scanning systems 250b may take in-process scans of the mailing 110a. These scans may be uploaded to Enterprise Host 150 for notification generation to Mailer System 220 and provision to Operations System 240. As the mailing 110a reaches its destination, scanning system 250c may provide a last scan to Enterprise Host 150 for providing a notification to Mailer System 220 and Operations Systems 240.

Figure 8:
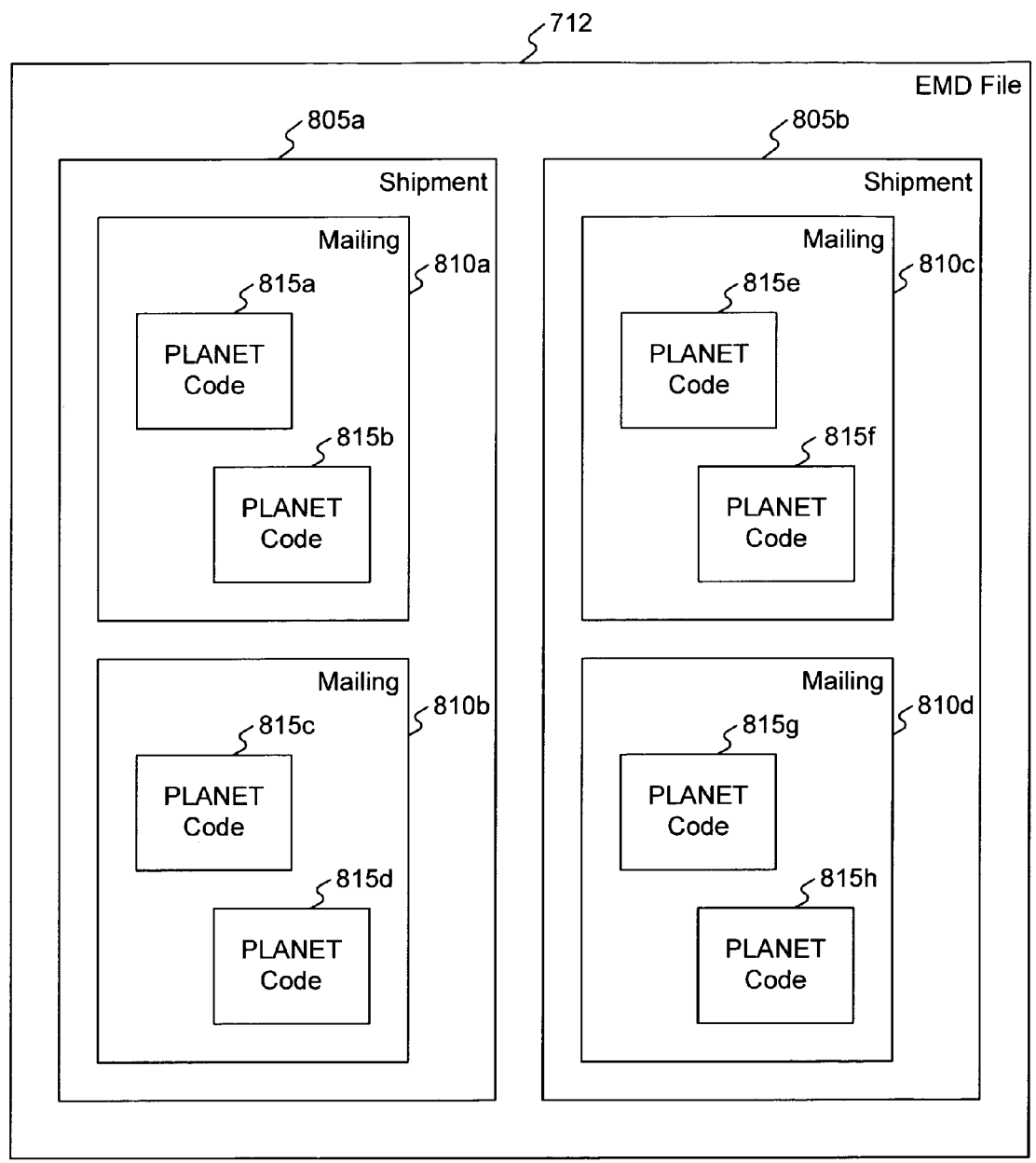
FIG. 8 illustrates the composition of an Electronic Mailing Data file consistent with the present invention.

FIG. 8 illustrates the composition of an Electronic Mailing Data file consistent with the present invention. Electronic Mailing Data file 712 may comprise data from one or more shipments 805. Each shipment 805 may comprise one or more mailings 810. Each mailing 810 may comprise zero or more mailing codes, for example, PLANET™ codes 815. PLANET™ codes were developed on the foundation of the existing POSTNET codes and are the opposite of the current Postent codes, reversing long bars for short bars and short bars for long bars. PLANET™ codes are well known to those skilled in the art and are explained in further detail in Mail.dat Specification for Entry Information and Planet™ Codes, published by the United States Postal Service, found in U.S. Provisional Patent Application No. 60/458,600, filed Mar. 28, 2003, and incorporated herein by reference.

FIG. 9 illustrates the fields, or elements, within an Electronic Mailing Data file consistent with the present invention. The Electronic Mail Data file is a 24 element, comma delimited, flat file containing information on mailings, shipments, and possibly PLANET™ codes. The first eight fields are the shipment fields and may include: the Shipment ID (a unique code); mailer's DUNS® Number (attained from Dun and Bradstreet); the drop location facility ZIP code; the drop location facility type code; the DSAS appointment number; the Transportation Owner's code 1020. The bar code 1020 is encoded with the: Service Type code; Mailer's DUNS® Number; the Drop Date; and the DSAS Appointment Time.

The next 12 fields are the Mailing fields and may include: the Mail Owner's Job Number; the Mailing Name; the Mail Owner's code 1020. The bar code 1020 is encoded with the: Service Type code; Mailer's DUNS® Number; mailer's Job Number; the Mail Class Code; the Mail Type Code; the Presort Level; the in-home delivery start date; the in-home delivery end date; the permit account number; the permit ZIP code; and the piece count of mailing or count value.

Field 21 is the piece count of the mailing. Fields 22 and 23 are the PLANET™ code and the number of mail pieces PLANET™ encoded, respectively. Finally, field 24 is the EMD version. Further details on these fields may be found in Electronic Mailing Data Specification Version 3.0 published by the United States Postal Service, found in U.S. Provisional Patent Application No. 60/458,600, filed Mar. 28, 2003, and incorporated herein by reference.

FIG. 10 illustrates the composition of a encoded shipment identifier consistent with the present invention. In this example, the encoded shipment identifier is a bar code 1020. The bar code 1020 is encoded with the: Service Type code; Mailer's DUNS® Number; shipment identifier; and a MOD 10 check digit.

Figure 11:
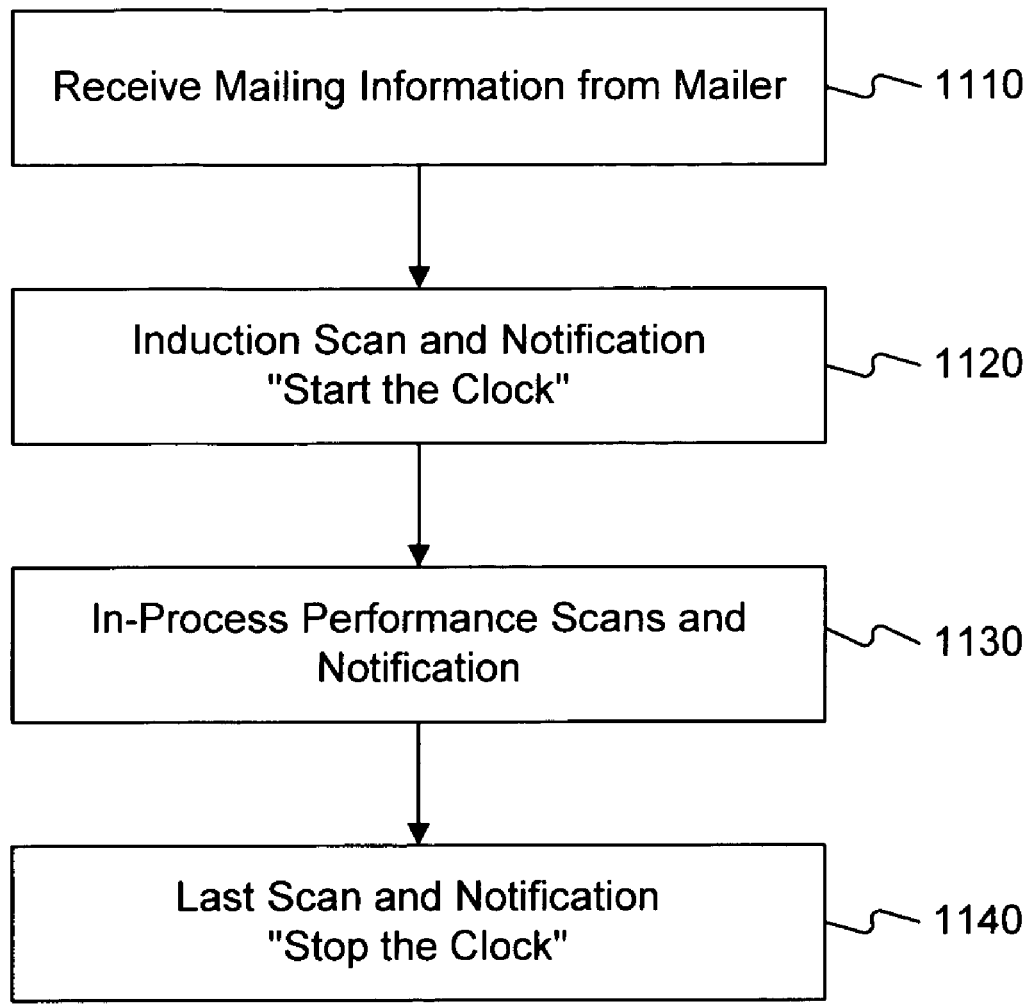
FIG. 11 is a flowchart of the induction and tracking method consistent with the present invention.

FIG. 11 is a flowchart of an induction and tracking method consistent with the present invention. At stage 1110, the system receives electronic mailing information from mailer and stores the information. At stage 1120, mailer has delivered the shipment and the system performs an induction scan. The system scans the encoded shipment identifier, matches it with the stored electronic mailing information, and notifies mailer of induction a step known as "Start the Clock". At stage 1130, the system may perform one or more in-process scans and matches, notifying mailer of the shipment status. At stage 1140, the last scan occurs and notification is made to mailer of the last scan. This stage is known as "Stop the Clock."

Figure 12:
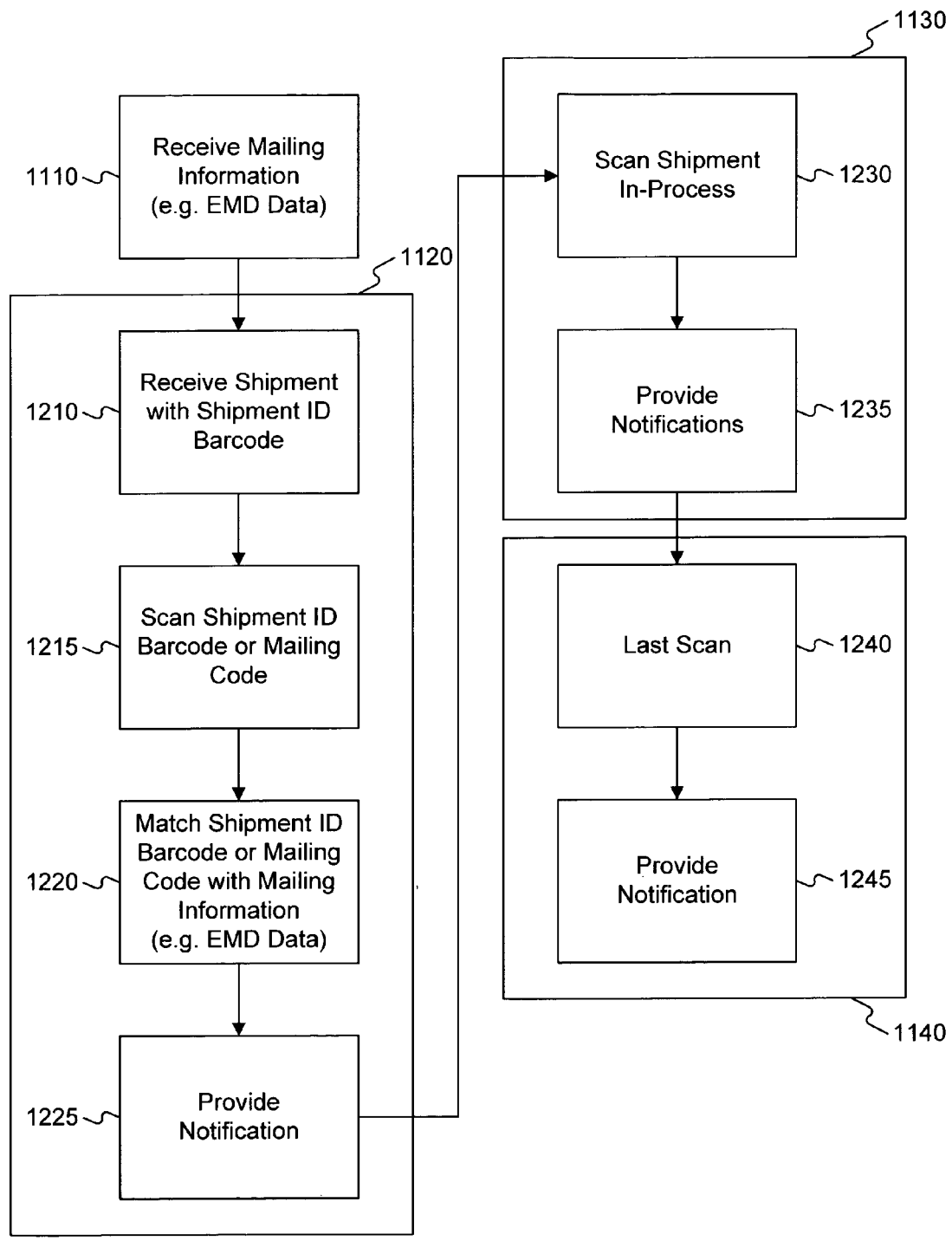
FIG. 12 is a more detailed flowchart of the induction and tracking method consistent with the present invention.

FIG. 12 is a more detailed flowchart of the induction and tracking method consistent with the present invention. At stage 1110, the system receives electronic mailing information from mailer and stores the information. At this stage, the system may utilize the electronic information for planning future mail loads. At stage 1210, the system receives the shipment along with the encoded shipment identifier for the shipment. At stage 1215, the system scans the encoded shipment identifier, e.g., a barcode, or scan a mailing code. At stage 1220, the system attempts to match the encoded shipment identifier with the shipment identifier of previously received electronic mailing information, or, in the case of scanning a mailing code attempts to match the mailing code with a mailing code associated with the shipment identifier previously received. Should a match not be found, an error is generated. Once a match is found, at stage 1225, the system may provide notification to mailer of induction of the shipment. The system may also provide information to the operating systems for planning purposes.

At stage 1230, the shipment may be scanned in-process. Either the shipment identifier may be scanned and matched or the mailing code may be scanned and matched, as previously described. At stage 1235, notifications may be generated and provided to mailer of the in-process status of the shipment. This information may also be provided to the operating systems for planning and delivery estimation purposes.

At stage 1240, the last scan occurs prior to delivery in-home. At stage 1245, notification of the last scan may be provided to mailer and the operating systems.

Figure 13:
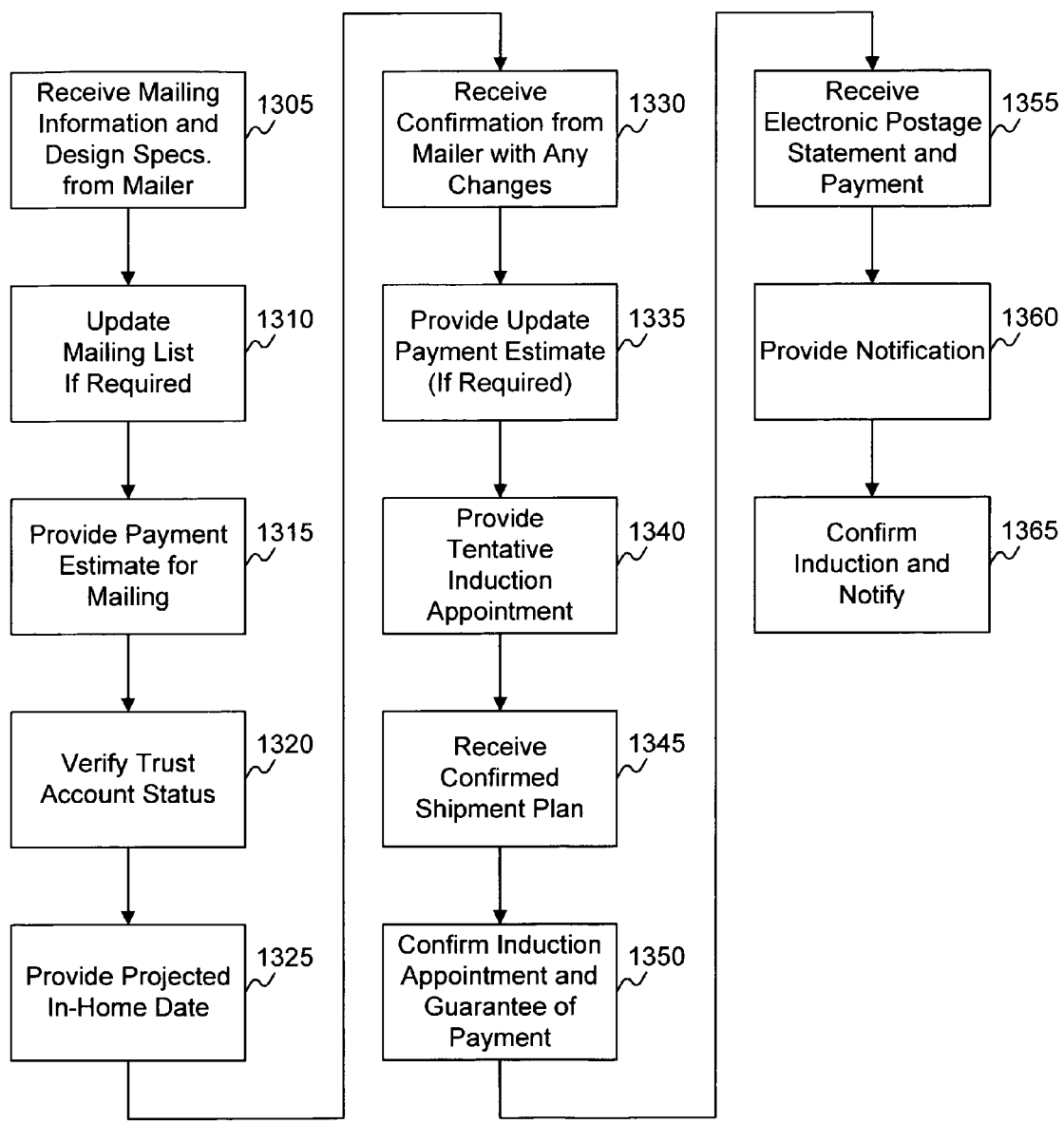
FIG. 13 is a flowchart of the induction, payment processing, and tracking method of the present invention.

FIG. 13 is a flowchart of an induction, payment processing, and tracking method of the present invention. At stage 1305, the system receives electronic mailing information, and possibly design specifications, from mailer. At stage 1310, the system may update its internal mailing lists associated with mailer if such an update is required. For example, each mailer or mail owner may have an associated mailing list maintained by the system to simplify the mailing process for mailer and/or mail owner. At stage 1315, the system provides an estimate of the payment required for the shipment based on the information contained in the electronic mailing information and an internal or external database of rates and tarrifs.

At stage 1320, the system may verify that an internal trust account, maintained on behalf of mailer or mail owner, contains enough funds to cover the estimated payment. The system may provide this verification of funds to mailer, and, should not enough funds be available, request a deposit from mailer or mail owner. At stage 1325, the system utilizes the electronic mailing information and the operating load of the system to provide an estimate of the potential in-home delivery dates based on an estimated induction date.

At stage 1330, the system may receive confirmation of the shipment from mailer. In addition, mailer may make changes to the previously submitted electronic mailing information based on the estimated in-home delivery dates or payment costs previously provided to mailer. At stage 1335, should the electronic mailing information have changed, the system will provide updates payment estimates. At stage 1340, the system may provide a tentative induction appointment for receipt of the shipment of mailings. At stage 1345, the system may receive a confirmed shipment plan from mailer, in which case, at stage 1350, the system will confirm the induction appointment and provide a guaranteed payment amount to cover the cost of delivery.

At stage 1355, the system receives an electronic postage statement covering payment of the shipment. At stage 1360, notification may be provided of the receipt of payment and at stage 1365, as induction occurs, induction is confirmed with notification to mailer.

Those skilled in the art will appreciate that all or part of systems and methods consistent with the present invention may be stored on or read from other computer-readable media, such as: secondary storage devices, like hard disks, floppy disks, and CD-ROM; a carrier wave received from the Internet; or other forms of computer-readable memory, such as read-only memory (ROM) or random-access memory (RAM).

Furthermore, one skilled in the art will also realize that the processes illustrated in this description may be implemented in a variety of ways and include multiple other modules, programs, applications, scripts, processes, threads, or code sections that all functionally interrelate with each other to accomplish the individual tasks described above for each module, script, and daemon. For example, it is contemplated that these programs modules may be implemented using commercially available software tools, using custom object-oriented code written in the C++ programming language, using applets written in the Java programming language, or may be implemented as with discrete electrical components or as one or more hardwired application specific integrated circuits (ASIC) custom designed just for this purpose.

It will be readily apparent to those skilled in this art that various changes and modifications of an obvious nature may be made, and all such changes and modifications are considered to fall within the scope of the appended claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents.

What is claimed is:

1. A method, comprising:
   receiving mailing information from a mailer, the mailing information comprising shipment information relating to a shipment and a mailing code associated with a mailing, the shipment information comprising a shipment identifier;
   receiving shipment at an induction facility, wherein the shipment comprises an encoded shipment identifier and a mailing associated with the mailing code;
   scanning at least one of the encoded shipment identifier or the mailing code into a scanned code;
   matching the scanned code to the shipment identifier;
   notifying the mailer of the induction of the shipment;
   scanning at least one of the encoded shipment identifier or the mailing code at a delivery facility; and
   notifying the mailer of the delivery of the shipment.

2. The method of claim 1, further comprising:
   estimating a cost to deliver the mailing based on the mailing information; and
   providing the estimated cost of the mailing to the mailer.

3. The method of claim 2, further comprising checking an account balance of the mailer to verify available funds for payment of the estimated cost to deliver the mailing.

4. The method of claim 2, further comprising:
   receiving confirmation that the shipment is incoming from the mailer; and
   debiting a trust account of the mailer with the estimated cost to deliver the mailing.

5. The method of claim 1, further comprising:
   during transportation of the shipment from the induction facility to the delivery facility, scanning the encoded shipment identifier as in process scan data.

6. The method of claim 5, further comprising:
   providing the in-process scan data to the mailer.

7. The method of claim 1, further comprising utilizing the mailing information to estimate future system loads.

8. The method of claim 7, wherein utilizing the mailing information to estimate future system loads further comprises:
   receiving an induction date in the mailing information, the induction date estimating the date upon which the mailing will be delivered to the induction facility; and
   estimating future system loads based on the induction date.

9. The method of claim 8, wherein estimating future system loads further comprises:
   receiving a count value representing the number of mailpieces in the mailing; and
   estimating future system loads based on the induction date and the count value.

10. The method of claim 1, further comprising providing an estimate of an in-home delivery date for the mailing.

11. A method of planning the future load of a mailing system, comprising:
    receiving mailing information from a mailer, the mailing information comprising shipment information having a shipment identifier, an estimated induction date, and a count value representing the number of mailpieces in the shipment; and
    estimating system load on a mail system based on the estimated induction date and the count value.

12. The method of claim 11 wherein the shipment information comprises an induction location and wherein estimating system load further comprises estimating system load on a mail system based on the induction location.

13. The method of claim 11 wherein the shipment information comprises a delivery location and wherein estimating system load further comprises estimating system load on a mail system based on the delivery location.

14. A system for tracking a mailing, the system comprising:
a memory; and
a processor coupled to the memory for:
receiving mailing information from a mailer, the mailing information comprising shipment information relating to a shipment and a mailing code associated with a mailing, the shipment information comprising a shipment identifier;
receiving the shipment at an induction facility, wherein the shipment comprises an encoded shipment identifier and a mailing associated with the mailing code;
scanning at least one of the encoded shipment identifier or the mailing code into a scanned code;
matching the scanned code to the shipment identifier;
notifying the mailer of the induction of the shipment;
scanning at least one of the encoded shipment identifier or the mailing code at a delivery facility; and
notifying the mailer of the delivery of the shipment.

15. The system of claim 14, wherein the processor provides the function of:
estimating a cost of the mailing based on the mailing information; and
providing the estimated cost to deliver the mailing to the mailer.

16. The system of claim 15, wherein the processor provides the function of checking an account balance of a trust account of the mailer to verify available funds for payment of the estimated cost to deliver the mailing.

17. The system of claim 16, wherein the processor provides the functions of:
receiving confirmation that the shipment is incoming from the mailer; and
debiting an account of the mailer with the estimated cost to deliver the mailing.

18. The system of claim 14, wherein the processor provides the functions of:
during transportation of the shipment from the induction facility to the delivery facility, receiving a scan of the encoded shipment identifier as in-process scan data.

19. The system of claim 18, wherein the processor provides the functions of:
providing the in-process scan data to the mailer.

20. The system of claim 14, wherein the processor provides the function of utilizing the mailing information to estimate future system loads.

21. The system of claim 20, wherein the processor provides the function of:
receiving an induction date in the mailing information, the induction date estimating the date upon which the mailing will be delivered to the induction facility; and
estimating future system loads based on the induction date.

22. The system of claim 21, wherein the processor provides the function of:
receiving a number of pieces of mail in the mailing information; and
estimate future system loads based on the induction date and the number of pieces of mail in the mailing information.

23. The system of claim 14, wherein the processor provides the function of providing an estimate of an in-home delivery date for the mailing.

24. A system for planning the future load of a mailing system, the system comprising:
a memory; and
a processor coupled to the memory for:
receiving mailing information from a mailer, the mailing information comprising shipment information having a shipment identifier, an estimated induction date, and a number of mail pieces in the shipment; and
estimating system load on a mail system based on the estimated induction date and the number of mail pieces in the shipment.

25. The system of claim 24 wherein the processor provides the function of estimating system load using an induction location provided in the shipment information.

26. The system of claim 24 wherein the processor provides the function of estimating system load based on a delivery location provided within the shipment information.

27. A computer-readable medium on which is stored a set of instructions for providing tracking of mailings, which when executed perform stages comprising:
receiving mailing information from a mailer, the mailing information comprising shipment information relating to a shipment and a mailing code associated with a mailing, the shipment information comprising a shipment identifier;
receiving the shipment at an induction facility, wherein the shipment comprises an encoded shipment identifier and a mailing associated with the mailing code;
scanning at least one of the encoded shipment identifier or the mailing code into a scanned code;
matching the scanned code to the shipment identifier;
notifying the mailer of the induction of the shipment;
scanning at least one of the encoded shipment identifier or the mailing code at a delivery facility; and
notifying the mailer of the delivery of the shipment.

28. The computer-readable medium of claim 27, further comprising instructions, which when executed perform stages comprising:
estimating a cost of the mailing based on the mailing information; and
providing the estimated cost to deliver the mailing to the mailer.

29. The computer-readable medium of claim 28, further comprising instructions, which when executed perform stages comprising:
checking an account balance of the mailer to verify available funds for payment of the estimated cost to deliver the mailing.

30. The computer-readable medium of claim 28, further comprising instructions, which when executed perform stages comprising:
receiving confirmation that the shipment is incoming from the mailer; and
debiting the mailer with the estimated cost to deliver the mailing.

31. The computer-readable medium of claim 27 further comprising instructions, which when executed perform stages comprising:
during transportation of the shipment from the induction facility to the delivery facility, scanning the encoded shipment identifier as in-process scan data.

32. The computer-readable medium of claim 31, further comprising instructions, which when executed perform stages comprising:
providing the in-process scan data to the mailer.

33. The computer-readable medium of claim 27, further comprising instructions, which when executed perform stages comprising:

utilizing the mailing information to estimate future system loads.

34. The computer-readable medium of claim 33, further comprising instructions, which when executed perform stages comprising:

receiving an induction date in the mailing information, the induction date estimating the date upon which the mailing will be delivered to the induction facility; and estimating future system loads based on the induction date.

35. The computer-readable medium of claim 34, further comprising instructions, which when executed perform stages comprising:

receiving a count value representing the number of mailpieces in the mailing; and estimating future system loads based on the induction date and the count value.

36. The computer-readable medium of claim 27, further comprising instructions, which when executed perform stages comprising:

providing an estimate of an in-home delivery date for the mailing.

37. A computer-readable medium on which is stored a set of instructions for estimating future loads on a mailing system, which when executed perform stages comprising:

receiving mailing information from a mailer, the mailing information comprising shipment information having a shipment identifier, an estimated induction date, and a count value; and estimating system load on a mail system based on the estimated induction data and the count value.

38. The computer-readable medium of claim 37 wherein the shipment information comprises an induction location and wherein the instructions when executed perform the stage of estimating system load further comprises estimating system load on a mail system based on the induction location.

39. The computer-readable medium of claim 37 wherein the shipment information comprises a delivery location and wherein the instructions when executed perform the stage of estimating system load further comprises estimating system load on a mail system based on the delivery location.

* * * * *

UNITED STATES PATENT AND TRADEMARK OFFICE
CERTIFICATE OF CORRECTION

PATENT NO. : 7,028,895 B2
APPLICATION NO. : 10/631269
DATED : April 18, 2006
INVENTOR(S) : Shahpour Ashaari It is certified that error appears in the above-identified patent and that said Letters Patent is hereby corrected as shown below:

In claim 1, column 14, line 11, "receiving shipment" should read --receiving the shipment--.

In claim 5, column 14, line 36, "in process" should read --in-process--.

In claim 22, column 15, line 65, "estimate" should read --estimating--.

Signed and Sealed this

First Day of August, 2006

JON W. DUDAS
*Director of the United States Patent and Trademark Office*